E. T. BARLOW,
Assignor to F. C. WILSON.
BARREL TAP AND FAUCET.
No. 9,802. Reissued July 12, 1881.
Fig. 2
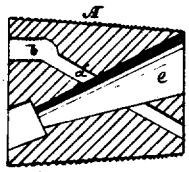
Fig I
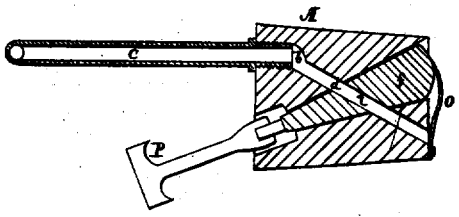
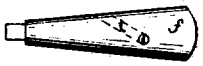
Fig 3
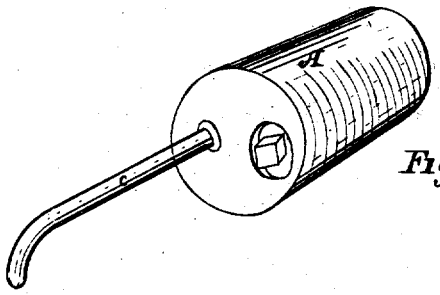
Fig 4.
Witnesses
Lh. E. Saugdahl
Jno. C. MacGregor
Inventor
Elisha T. Barlow.
By Johnson & Thacher
Attorneys
N. PETERS. Photo-Lithographer. Washington. D. C.

UNITED STATES PATENT OFFICE.

ELISHA T. BARLOW, OF SAN FRANCISCO, CALIFORNIA, ASSIGNOR TO F. CORTEZ WILSON, OF CHICAGO, ILLINOIS.

BARREL TAP AND FAUCET.

SPECIFICATION forming part of Reissued Letters Patent No. 9,802, dated July 12, 1881.

Original No. 179,468, dated July 4, 1876. Application for reissue filed March 7, 1881.

*To all whom it may concern:*

Be it known that I, ELISHA T. BARLOW, of San Francisco city and county, State of California, have invented an Improved Barrel Tap and Faucet; and I do hereby declare the following description and accompanying drawings are sufficient to enable any person skilled in the art or science to which it most nearly appertains to make and use my said invention or improvement without further invention or experiment.

My invention relates to that class of permanent taps for beer or other barrels in which the valve which admits the liquid to the faucet is arranged in the tap, and is operated by an independent key or implement after the faucet or tube through which the liquid is drawn has been secured in place in the tap.

Referring to the accompanying drawings, Figures 1 and 2 are longitudinal sections, showing the passages in my faucet. Fig. 3 is a view of the tapering plug. Fig. 4 is a perspective view of my device.

Let A represent a tap or metal plug, which is permanently secured in the head, or in one of the staves of a barrel or cask, so that one end will be inside of the barrel while the other is outside of it. In the outside face of this tap or plug, and at one side of its center, I make a bore, *b*, the interior of which is threaded, and into which I screw one end of the faucet or tube C. This bore *b* extends only a sufficient distance into the plug to furnish a socket to receive the faucet or bent pipe C. A hole or passage, *d*, leads from the bottom of the bore or socket *b*, and passes at an angle through the plug, so as to connect it with the interior of the cask or barrel. I then make a conical or tapering hole, *e*, entirely through the plug, at such an angle that it will cross the hole *d* at some point between the bottom of the socket and the inside end of the plug. This hole is made largest at the inside end of the plug, and gradually decreases in size toward the outer end. In this conical hole I place a conical or tapering plug, *f*, which can be ground to fit, in the manner of fitting conical plugs in ordinary faucets. Diagonally through this plug I make a hole or passage, *i*, which can be brought in line with the hole *d* by rotating the plug to a certain point, thus opening communication between the interior of the barrel and the faucet; but by turning it a short distance in either direction the hole *i* is turned out of line with the passage *d* and the connection is cut off.

To keep the plug *f* pressed firmly in its conical seat I secure a flat spring, *o*, to the inner end of the plug, so that its free end will press upon the end of the plug. As the plug wears this spring will keep it pressed snugly in place and prevent leakage. The large end of the conical plug being on the inside of the tap A, the pressure of the liquid contained in the barrel will tend to force it outward, and thus keep the joint tight. An independent key, P, is used for turning this plug, and for this purpose I make the outer end of the plug of a proper shape to receive a key-socket; or its outer end might be nicked, and an ordinary screw-driver could be used for turning it. As the plug stands at an angle to the faucet the key or other implement used for turning it will also be held at an angle, so as to be out of the way of the faucet.

I thus produce a combined tap and faucet that can be cheaply manufactured, and which is not likely to get out of order.

A common bent tube can be used instead of a faucet, and will serve every purpose as a conductor of the liquid.

I am aware that a permanent tap for barrels, in which the valve which admits the liquid to the faucet is operated by an independent wrench or key, has been heretofore patented.

Having thus described my invention, what I claim, and desire to secure by Letters Patent, is—

1. A tap provided with communicating apertures arranged so that when the tap is inserted in the vessel one will open within and the other without the vessel, in combination with a plug running lengthwise of the tap and provided with a discharge-passage in the body thereof, the openings of which are arranged to register with the communication between the apertures of the tap when the plug is rotated to the proper position, substantially as described.

2. The tap A, provided with communicating apertures *d b*, the openings of which are on opposite sides of its axis, and which open one within and one without the vessel, in combination with the longitudinal plug *f*, provided with an inclined passage, *i*, substantially as and for the purpose set forth.

3. The permanent tap or plug A, having the hole or passage *e*, in combination with the conical valve or plug *f*, with its hole or passage *i* arranged to cross said passage *e* transversely, and to connect the interior of the barrel or cask with the passage leading to the faucet, sustantially as and for the purpose described.

4. In combination with the tap or plug A, provided with the angular passage *e*, and a passage connecting the same with the faucet C, and transverse conical plug *f*, with its passage *i*, the spring *o*, for keeping the plug in place and pressing it to its seat, substantially as specified.

ELISHA T. BARLOW.

Witnesses:

EDWARD E. OSBORN,

WM. F. CLARK.